United States Patent [19]

Cooper

[11] Patent Number: 4,688,746

[45] Date of Patent: Aug. 25, 1987

[54] SATELLITE DESPIN DEVICE

[76] Inventor: James W. Cooper, 2384 Golf Links Rd., Sierra Vista, Ariz. 85635

[21] Appl. No.: 668,502

[22] Filed: Nov. 5, 1984

[51] Int. Cl.[4] .............................................. B64G 1/28
[52] U.S. Cl. .................... 249/165; 244/164; 244/158 R
[58] Field of Search .................. 244/158 R, 165, 164; 322/4

[56] References Cited

U.S. PATENT DOCUMENTS

| 2,589,454 | 3/1952 | Storsand | 322/4 |
| 3,312,422 | 4/1967 | Simmons et al. | 244/165 |
| 3,714,434 | 1/1973 | Mears, Jr. et al. | 244/165 |
| 4,218,624 | 8/1980 | Schiavone | 322/4 |
| 4,275,861 | 6/1981 | Hubert | 244/165 |

Primary Examiner—Trygve M. Blix
Assistant Examiner—Rodney Corl

[57] ABSTRACT

One or more spinning flywheels are adapted to despin or partially despin a rotating mass such as a satellite and to convert the rotational energy into heat or electrical energy. The flywheels have one degree of freedom, parallel to the satellite, spin axis. This one degree of freedom allows the flywheel to precess in the manner of a gyroscope. As the flywheel precesses it turns a shaft which drives an electrical generator which produces electrical power that can be taken out of the despin device to drive external electrical devices that will disperse the rotational energy in the form of heat, light or electrically driven chemical changes. The flywheels exchange rotational energy after the spin vector of the spinning flywheel becomes congruent with the spin vector of the spinning satellite, thereby allowing the energy extraction process to be repeated. Bearing loss makeup energy is restored to the spinning flywheel system by feedback from the extracted satellite rotational energy.

6 Claims, 8 Drawing Figures

2+9+21+28+29+35+36 = 38

4,688,746

SATELLITE DESPIN DEVICE

BACKGROUND OF THE INVENTION

Satellites and satellite-like objects are now despun by jets of steam or hot gasses from rocket engines or by weights on wires. The jet process puts products of combustion in orbit with the satellite or satellite-like object where they are attracted to close proximity to the satellite or satellite-like object by gravity of the satellite. Given time and enough products of combustion, the satellite will be surrounded by an atmosphere of waterr, ice, smoke and other particles that may be dense enough to interfere with delicate scientific experiments and long range visual and photographic work. The mechanism of interference could be by condensation of particles on inlet ports, windows, exit ports, camera mirrors, external sensors and, indeed, on the internal workings of instruments and biota that may be present during the mission and be required with the satellite's pristine, uncontaminated near exposure.

The use of weights on a long wire to despin the satellite or satellite-like objects is effective but does not allow the experiments that populate the satellite or satellite like object to use the satellite's energy of rotation.

SUMMARY OF THE INVENTION

It is, accordingly, an object of the present invention to provide an improved system for converting the existing forms of energy to another form for the benefit of optimizing satellite and satellite-like object's operation.

It is also an object of the present invention to eliminate or reduce the products of combustion and pollution external to the satellite or satellite-like object so the users of the satellite or satellite-like object may continue to function in an optimum manner.

It is further an object of the present invention to assure that the long term use of the satellite or satellite-like object will not be adversely effected by the short term release of pollutants external to the satellite or satellite-like object.

It is also an object of the present invention to make use of the rotational energy of the satellite or satellite-like object within the satellite or satellite-like objects in the form of electrical energy or heat.

In accomplishing these and other objects there is provided an energy conversion system that incorporates one or more masses such as flywheels and the like. The masses of the flywheels can be small in relation to the mass of the satellite or satellite-like object. One flywheel is initially spun at a high rate.

The magnitude and direction of the spinning mass of the flywheel or like can be represented by a spin vector. The positive end of the spin vector is determined by the right hand rule. If the curved fingers of the right hand point in the direction of the spin of the mass, when the axis of the spin is in the palm, the finger tips point in the positive direction of the spin vector. The length of the spin vector represents the kinetic energy in the rotating flywheel.

As the satellite or satellite-like object spins, it also has a spin vector. The flywheel is so spun that its spin vector is 180° out of phase with the spin vector of the satellite.

The flywheel is contained in a housing which is attached to the shaft of an electrical generator. This electrical generator is attached rigidly to the satellite. As the satellite rotates the flywheel will precess so the spin axis will try to become congruent to the spin vector of the satellite. The precession will turn the shaft of the electrical generator and produce electrical power which can then be used for housekeeping and other tasks on or within the satellite.

When the two spin vectors become congruent the generation of electrical power will stop.

At this time the spin energy of the first flywheel is transfered to the second flywheel such that the spinning flywheel's spin vector is again 180° out of phase with the satellite's spin vector. The second flywheel can now precess and generate electrical power until its spin vector becomes congruent with the spin vector of the satellite.

The process can be repeated until the spin energy of the flywheels become depleted by bearing friction or windage or the satellite is despun.

The transfer of spin energy between flywheels is accomplished by providing an electrical generator or variable speed hydraulic pump or like on the spinning flywheel housing. This spin transfer generator is coupled to the flywheel shaft by a clutch. On the nonspinning flywheel an electrical or hydraulic motor or like is provided on the flywheel shaft and is fixed to the flywheel housing.

When the clutch joins the spin transfer electrical generator to the shaft of the spinning flywheel, the spin transfer generator generates power to drive the motor on the initially nonspinning flywheel and thereby transfers the spin energy from the first flywheel to the second flywheel.

Outside energy must be given to the flywheel system to make up the flywheel spin energy lost through bearing friction and windage. This makeup energy can come from the spin vector coupling generator or from outside of the despin system. It enters the flywheels by driving the spin motor-generator transfer system, driving the motor.

Additional objects of the present invention reside in the specific design of the exemplary system.

DESCRIPTION OF THE PREFERED EMBODIMENT

Figure 1:
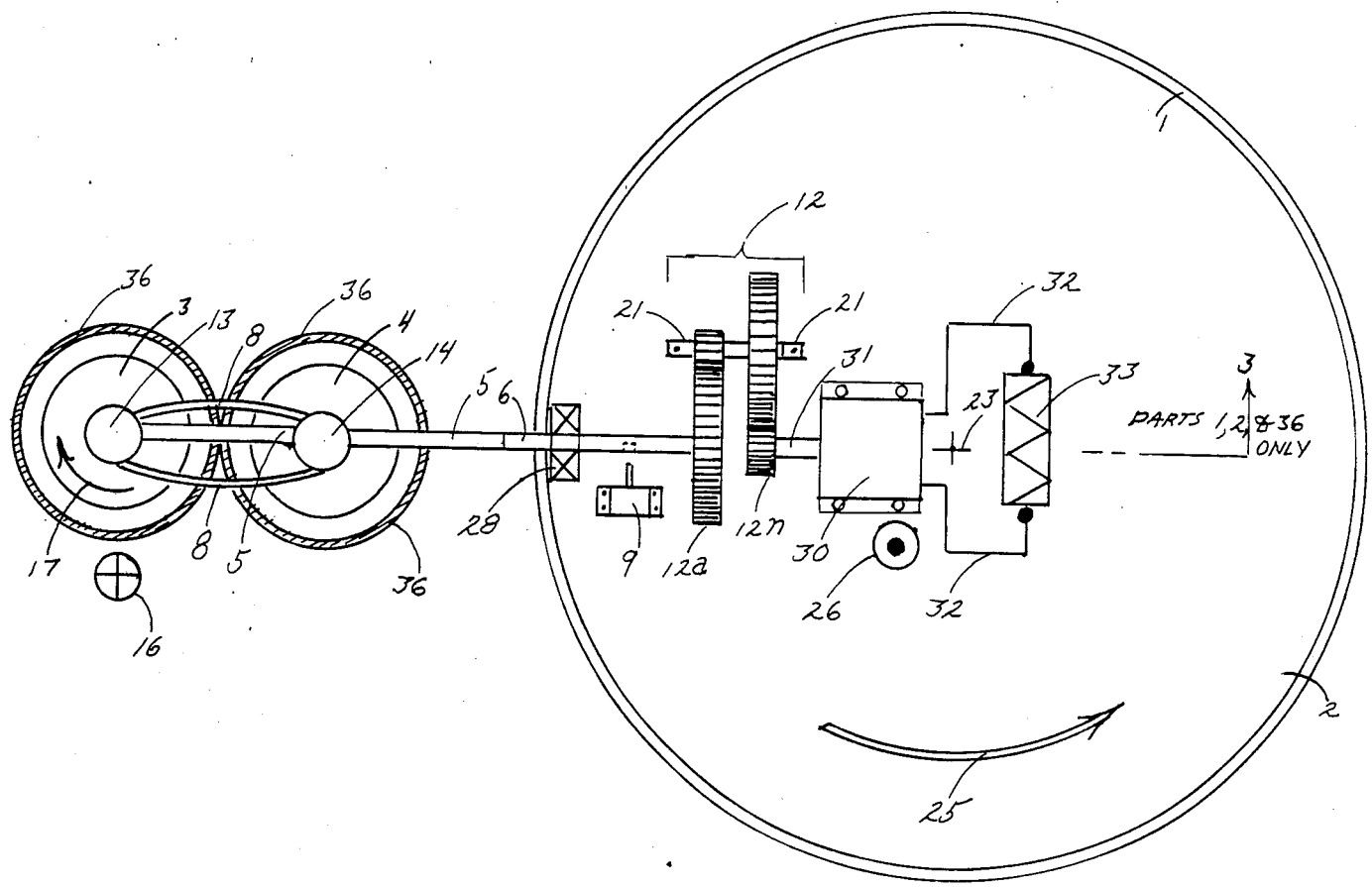
FIG. 1 is a representation of a spinning satellite looking down on the satellite's spin axis and spin vector with the system according to this invention being at the start of a satellite spin energy conversion. The satellite spin vector is coming up out of the page. The flywheel spin vector is going down into the page.
Figure 3:
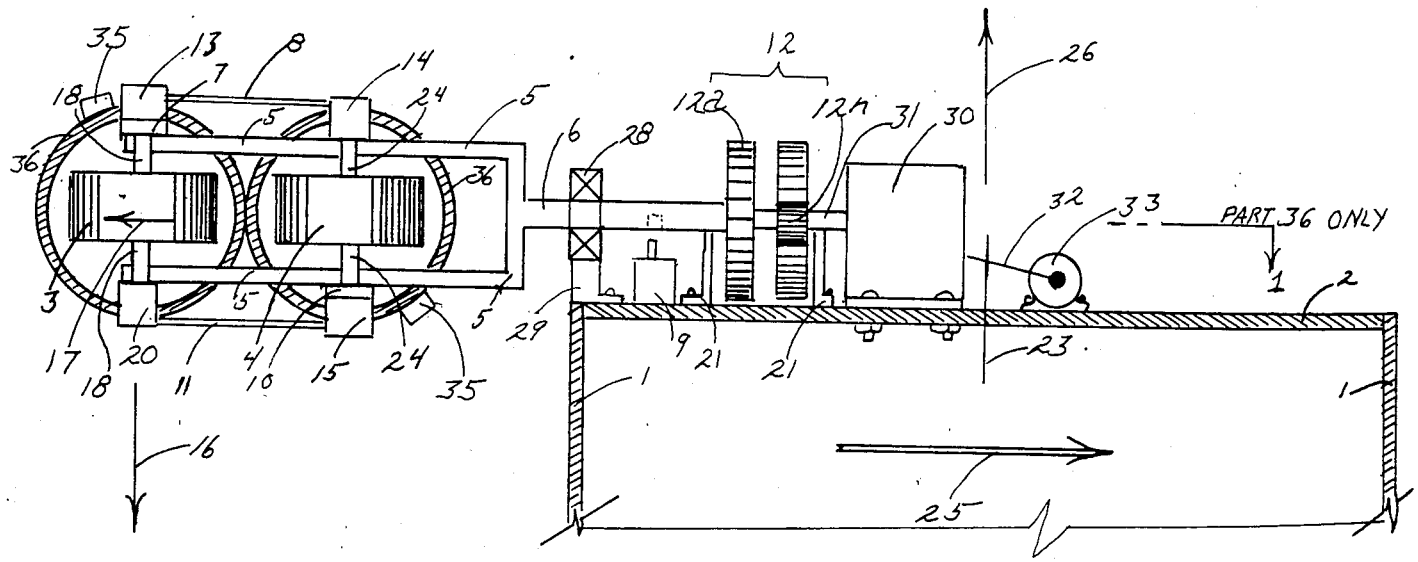
FIG. 3 is a representation of the spinning satellite seen from the side with the satellite spin vector going up and the system in accord to this invention being at the start of a satellite spin energy conversion. The spin vector of the flywheel is going down.

Refering to the drawings in more detail, FIG. 1 is a view of satellite 1 seen from the end of the spin axis 23. FIG. 3 is a view orthogonel to spin axis 23 of satellite 1.

For convience the applicant uses the symbol ⊙ to stand for an inertial spin vector with the movement out of the paper, the symbol representing the point on an arrow. The symbol ⊕ is used for an inertial spin vector with the movement into the paper, the symbol representing the feathers on the end of an arrow.

Figure 6:
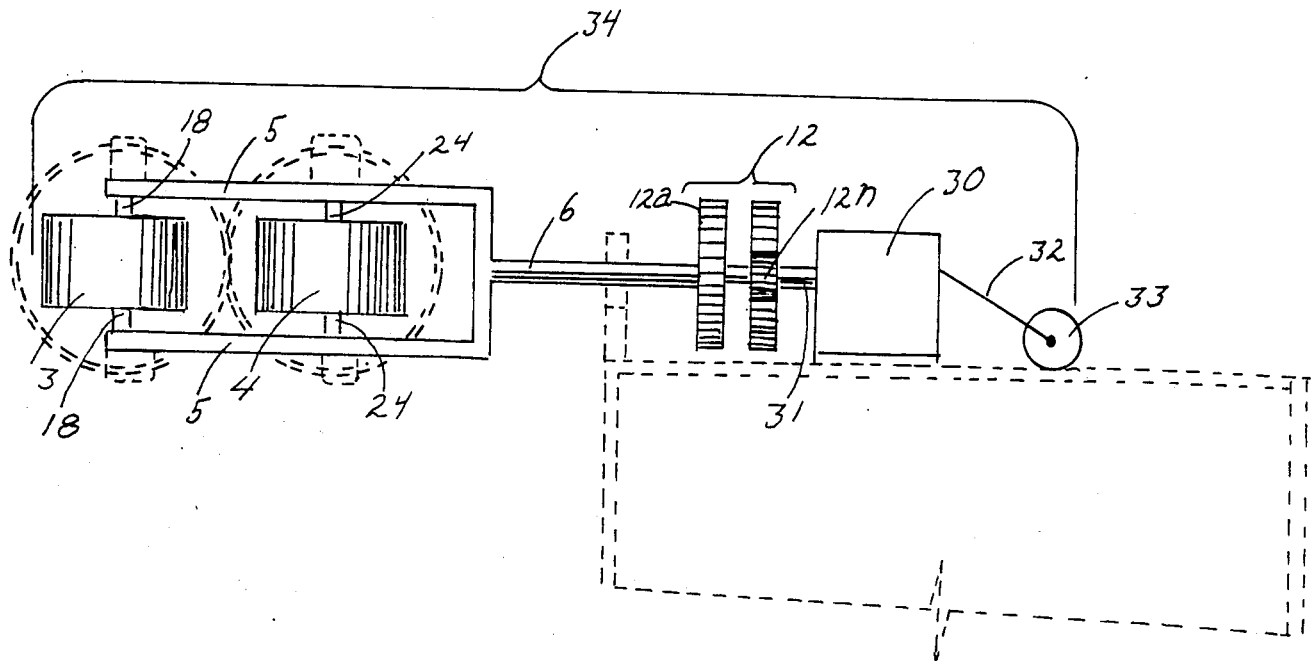
FIG. 6 is a representation of the main power subsystem and is shown in solid lines. The dashed lines are to orient the main power subsystem within the satellite despin device.
Figure 7:
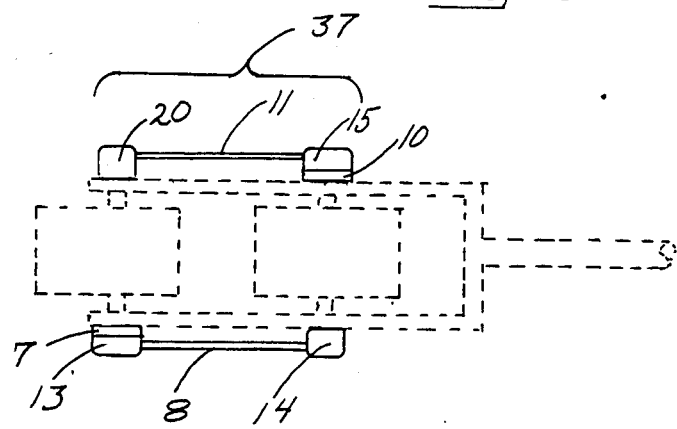
FIG. 7 is a representation of the spin makeup and transfer subsystem. The dashed lines are to orient the spin makeup and transfer subsystem within the satellite despin device.

Three subsystems comprise the satellite despin device invention. They are the main power subsystem 34, FIG. 6, the spin makeup and transfer subsystem 37, FIG. 7 and supporting means 38, FIG. 8.

The purpose of the main power subsystem 34 is to convert the inertial stiffness of the spinning flywheel 3 and in turn, the inertial stiffness of the spinning flywheel 4 into electrical power at the main power generator 30. Flywheel 3 in FIG. 1 and FIG. 3 is shown spun about axle 18 in spin direction 17. By the right hand rule, inertial spin vector 16 points down in FIG. 1 and FIG. 3. The satellite 1 is rotating in spin direction 25 about spin axis 23. By the right hand rule, satellite 1's inertial spin vector 26 points up in FIG. 1 and FIG. 3. The positive direction of inertial spin vector 16 and satellite 1's inertial spin vector 26 are 180° out of phase. As satellite 1 rotates flywheel 3 in inertial space, flywheel 3 will try to precess so the inertial spin vector 16 becomes congruent with the inertial spin vector 26 of satellite 1. The two inertial spin vectors are congruent when their positive ends point the same direction and the inertial spin vectors are parallel.

As flywheel 3 precesses, axle 18, connected to the flywheel cage 5 puts a torque on the flywheel cage 5. This torque twists the flywheel cage 5, which is connected to the cage axle 6. The cage axle 6, connected to the gear means 12, turns the first gear 12a in the gear means 12. This turning progresses through the gear means 12 until the last gear 12n in the gear means 12 is in rotation. This last gear 12n is connected to the rotor 31 of the main power generator 30. The housing of the main power generator 30 is fixed to the base plate 2. The rotor 31 is turned in relation to the main power generator 30 thereby changing rotational energy into electrical energy. The electrical energy is allowed to flow in power transmission lines 32 through the electrical sink means 33. The electrical sink means 33 is shown as a resistor. It could also be an electrical motor, light generator means, electrical bus or the like. The main power generator 30 could be a hydraulic pump or a pneumatic pump or the like. A hydraulic pump or a pneumatic pump or the like would require the sink to be a hydraulic or a pneumatic operated means.

Figure 2:
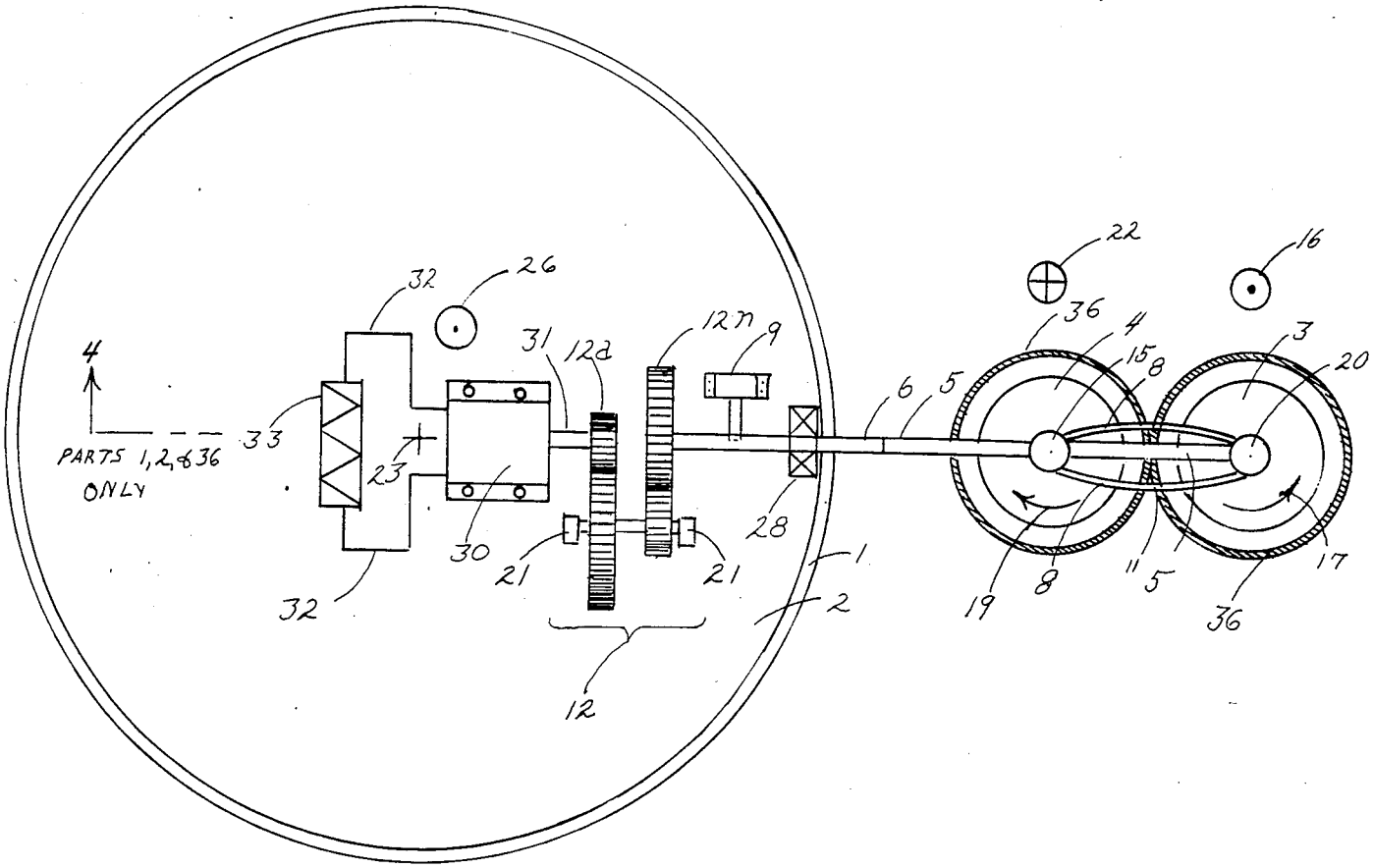
FIG. 2 is a representation of the spinning satellite looking down on the satellite with a system according to this invention being at the end of a satellite spin energy conversion. The spin vector of the satellite and the spinning flywheel is coming up out of the page. The second flywheel is partially spun up and its vector is going down into the page.
Figure 4:
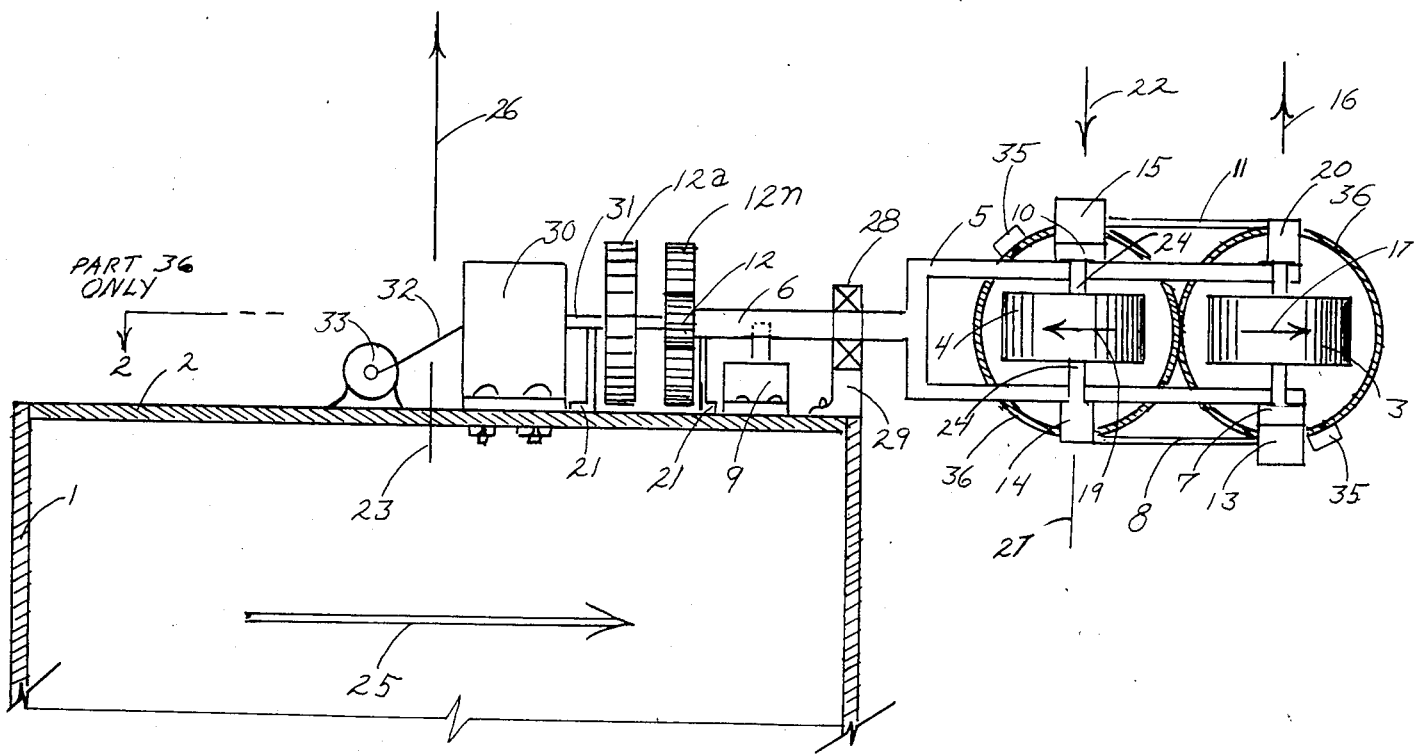
FIG. 4 is a representation of the spinning satellite seen from the side with the spin vector going up and the system according to this invention being at the end of a satellite energy conversion. The spin vector of the first flywheel is going up and is congruent with the spin vector of the satellite. The spin vector of the second flywheel is going down and is 180° out of phase with the satellite spin vector. The flywheel spin energy transfer system is in operation.

When the precession of flywheel 3 has progressed so the inertial spin vector 16 has become congruent with the inertial spin vector 26 of satellite 1, the conversion of inertial spin energy of satellite 1 to electrical energy will stop. The configuration of the satellite despin device at this time is shown in FIGS. 2 and 4. The illustrations of FIG. 2 and FIG. 4 show the satellite despin device invention 180° from the position shown in FIG. 1 and FIG. 3. The exact position will depend on the parameters of the hardware design of flywheel 3 and flywheel 4, the gear means 12 the main power generator 30 and the electrical sink means 33.

FIGS. 2 and 4 depict the spin up of flywheel 4 as having started.

When the inertial spin vector 16 becomes parallel with the satellite 1 inertial spin vector 26, inertial spin vector 16 must be inverted 180° if the generation of electrical energy from the rotation of satellite 1 is to continue. The inversion of inertial spin vector 16 is accomplished by the use of the spin makeup and transfer subsystem 37. The spin makeup and transfer subsystem 37, FIG. 7, converts the inertial rotational energy of flywheel 3, as represented by inertial spin vector 16, to a noninertial form of energy. This noninertial from of energy is then used to construct an inertial spin vector 22 that is 180° out of phase with inertial spin vector 26 of satellite 1. This is done by spinning flywheel 4 in spin direction 19. The inertially driven precession can then again continue to turn the main power generator 30.

The spin makeup and transfer subsystem 37 connects to flywheel 3 at axle 18. Clutch 7 connects to axle 18 and to the rotor of respin generator 13. The body of respin generator 13 is fixed to flywheel cage 5. When clutch 7 connects axle 18 of flywheel 3 to the respin generator 13, respin generator 13 turns and produces electrical power from the rotating, inertial energy of flywheel 3. This power is transported by the 3 to 4 respin energy transfer circuit 8 to respin motor 14 of flywheel 4. Respin motor 14 is attached to axle 24 of flywheel 4 and to flywheel cage 5. Respin motor 14 spins up flywheel 4 using the energy from flywheel 3. The new inertial spin vector 22 of flywheel 4 is now 180° out of phase with the inertial spin vector 26 of satellite 1.

During the spin up of flywheel 4 part of the control and support means 38, the cage axle rotation lock 9, has been activated. The cage axle rotation lock 9 prevents the cage axle 6 from rotating in relation to the main power generator 30. After the flywheel 4 is essentially spun up, the cage axle rotation lock 9 is withdrawn and the precession of flywheel 4 can take place, generating electrical power at the main power generator 30.

While the cage axle rotation lock 9 is shown as a pin and aperture arrangement, it is to be understood that any suitable means of locking the cage axle 6 against rotation with respect to the main power generator 30 is contemplated such as a ratchet, friction clutch and the like.

Figure 5:
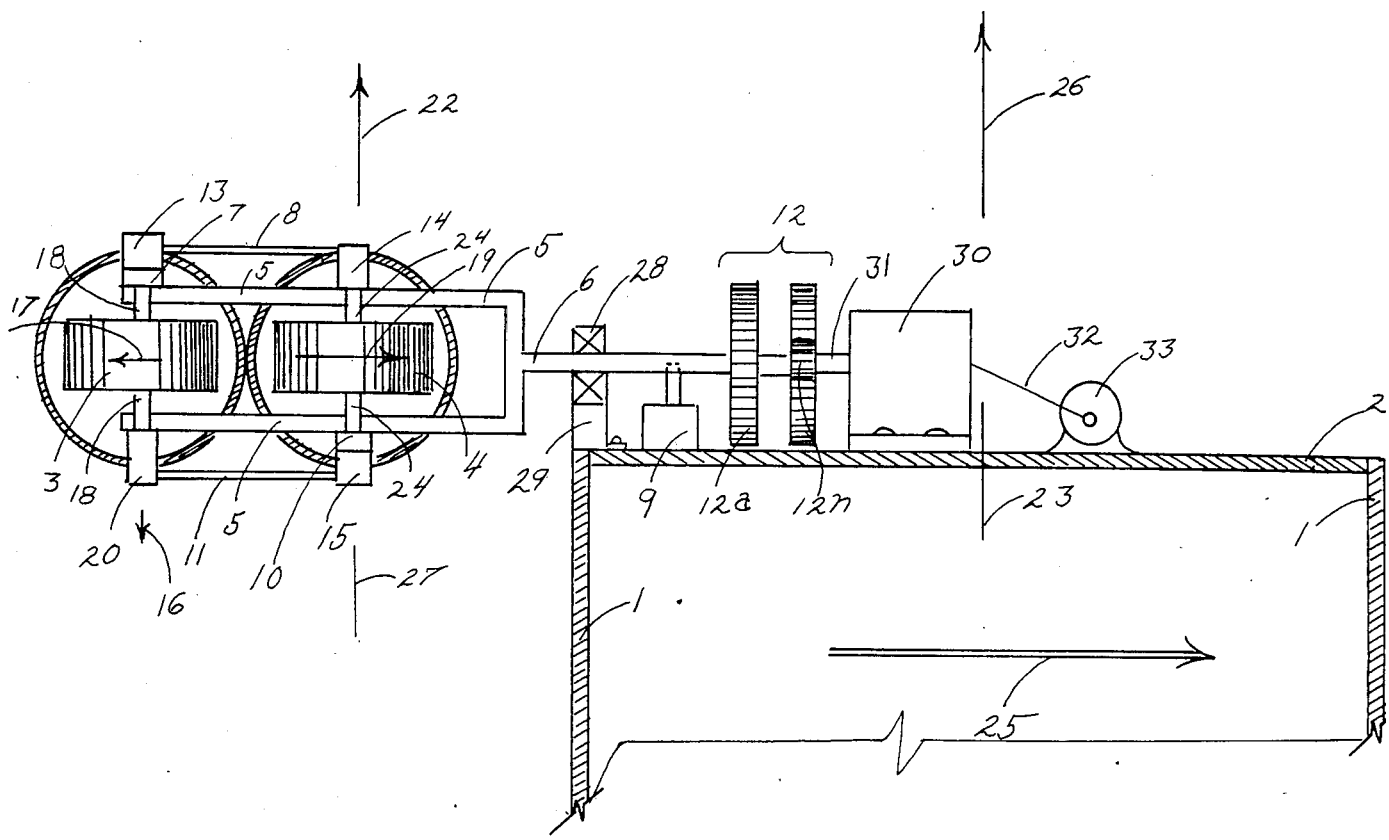
FIG. 5 is a representation of the spinning satellite seen from the side with the spin vector going up and the system according to this invention being at the end of a satellite energy conversion. The spin vector of the second flywheel is going up and is congruent with the spin vector of the satellite. The spin up of the first flywheel has just started.

Refering to FIG. 5 showing the satellite despin device in satellite 1 after satellite 1 has rotated such that the spin axis 27 of flywheel 4 has become parallel with the spin axis 23 of satellite 1 and the inertial spin vector 22 is congruent with the inertial spin vector 26 of satellite 1. The power generation at the main power generator 30 will now have stopped.

To start the power generation again, flywheel 3 must be spun up with the inertial spin vector 16 being 180° out of phase with the inertial spin vector 26 of satellite 1. This is accomplished by using the spin makeup and transfer subsystem again to convert the inertial rotational energy of flywheel 4, as represented by inertial spin vector 22, to a noninertial form of energy. This noninertial form of energy is then used to construct inertial spin vector 16 that will be 180° out of phase with satellite 1 inertial spin vector 26.

Flywheel 4 is connected to axle 24. Also connected to axle 24 is flywheel 4 clutch 10. Connecting to the other side of clutch 10 is the rotor of respin generator 15. The body of respin generator 15 is fixed to flywheel cage 5. When clutch 10 connects axle 24 to the respin generator 15, respin generator 15 turns and produces electrical power from the rotating, inertial energy of flywheel 4. This power is transported by the 4 to 3 respin transfer circuit 11 to the respin motor 20 of flywheel 3. The respin motor 20 spins up flywheel 3 using energy from flywheel 4. The inertial spin vector 16 of flywheel 3 is initially 180° out of phase with the inertial spin vector 26 of satellite 1 due to the spin direction 17 of flywheel 3.

When the cage axle rotation lock 9 is removed from the cage axle 6, flywheel 3 can start to precess, repeating the process of generating electrical energy from the rotation of the satellite.

The internal friction losses between axle 18 and the flywheel cage 5 and between axle 24 and the flywheel cage 5 and losses due to windage friction on flywheel 3 and flywheel 4 can be made up by feeding part of the power produced at the main power generator 30, or from a general use electrical bus, back into the spin makeup and transfer subsystem 37.

Figure 8:
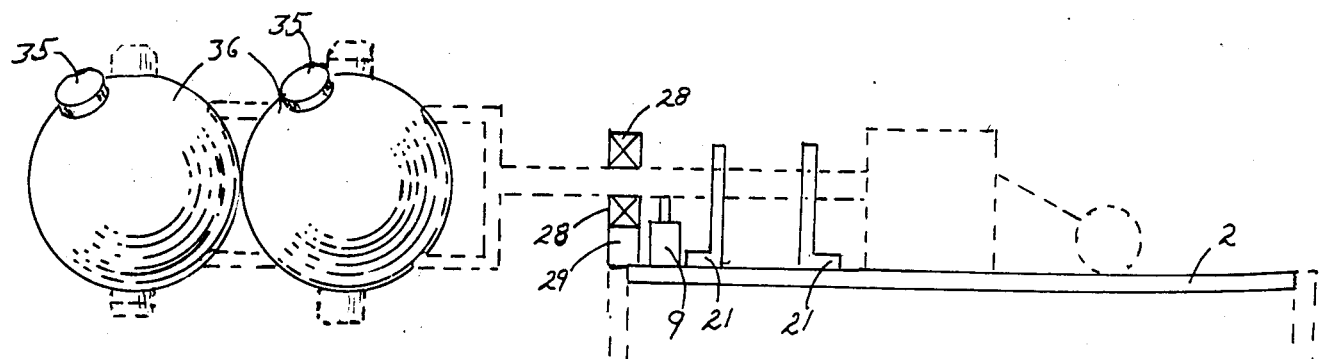
FIG. 8 is a representation of the supporting means. The dashed lines are to orient the supporting means within the satellite despin device.

Supporting means 38, FIG. 8, comprises the parts and means necessary to the function of the main power subsystem 34 and the spin makeup and transfer subsystem 37. The flywheel environmental enclosure 36 of supporting means 38 attaches to the flywheel cage 5. Attached to the environmental enclosure 36 is the vacuum pump means 35.

Cage axle 6 and the flywheel cage 5 are supported by the axle bearing means 28 which is attached to the base plate 2 through the bearing means support 29.

The gear means 12 is supported by the gear support means 21 which attaches to the base plate 2.

What is claimed is:

1. A mechanical device that removes rotational energy from a rotating object such as a satellite by the precession of a flywheel driving a main power generator, thereby despinning the satellite and comprised of;

flywheel means mounted on a housing means that allow for spinning up of the flywheel means so the inertial spin vector is essentially 180° out of phase with the inertial spin vector of the satellite;

housing means mounted on a cage axle means that is substantially perpendicular to the axis of rotation of a satellite and said cage axle means rotates as the flywheel means precesses;

cage axle means that is attached by gear means to a main power generator means to match the speed of rotation of the cage axle means to the requirements of the main power generator means;

said main power generator means attached to a base plate means;

said base plate means attached to the satellite;

stop means connected to the base plate means and coacting with the cage axle means to stop the rotation of the cage axle means during flywheel means respin and to allow the rotation of the cage axle means when the flywheel means precesses;

power dissipation and transfer means connected to the said main power generator means and to the base plate means;

housing means enclosing said flywheel means including a vacuum means within said housing means to produce a vacuum within said housing means;

flywheel spin transfer means mounted on the flywheel housing means;

energy transfer means from the main power generator means to the flywheel spin transfer means.

2. The mechanical despin device of claim 1 wherein the main power generator means is a hydraulic motor means.

3. The mechanical despin device of claim 1 wherein the main power generator means is a pneumatic motor means.

4. The mechanical despin device of claim 1 where the main power generator is an electrical generator and the flywheel spin transfer means has an electrical motor means to spin the flywheel means and a portion of the energy is fed back from the main power generator means to the electrical motor means to maintain a predetermined rotational speed of the flywheel means.

5. The mechanical despin device of claim 1 having one flywheel means and one energy storage means and a flywheel rotational energy conversion and transfer means to the said energy storage means from the said flywheel means and a flywheel spinup means and a conversion and transfer means from said storage means to said flywheel spinup means.

6. A method of despinning a rotating object, such as a satellite, and obtaining usefull energy from the rotational energy of the object comprising the steps of;

mounting two flywheels with their axis of rotation perpendicular to a cage axle and the axes of the flywheels parallel to themselves;

mounting the cage axle essentially perpendicular to the spin axis of the satellite and the cage axle capable of being twisted with respect to the satellite as the flywheels precess due to the rotation of the satellite;

locking the cage axle to keep it from twisting with respect to the satellite;

spinning a first flywheel to a predetermined rotational speed so the spun up flywheel has a spin vector essentially 180° out of phase with the inertial spin vector of the satellite;

unlocking the cage axle with respect to the satellite and allowing the spun up flywheel to precess, twisting the cage axle with respect to a main power generator and the satellite;

connecting the cage axle to the main power generator to convert the twisting movement of the cage axle to a usagle form of energy which is derived from the rotational energy of the satellite;

feeding a portion of the converted energy to the spun up flywheel to maintain the predetermined speed of rotation and recovering the excess energy;

allowing the flywheel precession to continue until the spin vector is essentially parallel and in phase with the inertial spin vector of the satellite;

locking the cage axle to keep it from rotating with respect to the satellite;

transfering the spin energy of the spinning flywheel to a second, nonspinning flywheel thereby despinning the said first flywheel and spinning up the said second flywheel so the said second flywheel has an inertial spin vector that is essentially 180° out of phase with the inertial spin vector of the satellite;

unlocking the cage axle with respect to the satellite and allowing the spinning flywheel to precess, twisting the cage axle with respect to the main power generator and the satellite;

connecting the cage axle to the main power generator to convert the twisting movement thereof to a usable form of energy which is derived from the rotational energy of the satellite, thereby slowing the spin of the satellite;

feeding a portion of the energy from the main power generator to the flywheel to maintain the predetermined speed of rotation and recovering the excess energy.

* * * * *